(12) United States Patent
Bace

(10) Patent No.: US 6,836,809 B2
(45) Date of Patent: Dec. 28, 2004

(54) WRITING AND READING DATA FROM A QUEUE

(75) Inventor: Matthew M. Bace, North Andover, MA (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 10/226,083

(22) Filed: Aug. 22, 2002

(65) Prior Publication Data

US 2003/0120842 A1 Jun. 26, 2003

Related U.S. Application Data

(60) Provisional application No. 60/314,443, filed on Aug. 23, 2001.

(51) Int. Cl.[7] .................................................. G06F 3/00
(52) U.S. Cl. ............................ 710/57; 710/52; 711/150; 711/170

(58) Field of Search ..................... 710/52, 57; 711/150, 711/170

(56) References Cited

U.S. PATENT DOCUMENTS

| | | | | | |
|---|---|---|---|---|---|
| 5,459,839 | A | * | 10/1995 | Swarts et al. | 710/112 |
| 5,557,744 | A | * | 9/1996 | Kobayakawa et al. | 709/232 |
| 6,032,179 | A | * | 2/2000 | Osborne | 709/213 |

* cited by examiner

*Primary Examiner*—Matthew Kim
*Assistant Examiner*—Hetul Patel
(74) *Attorney, Agent, or Firm*—Fish & Richardson P.C.

(57) ABSTRACT

A method of processing data includes writing a data block of size m where m is greater than zero into a queue. The method also includes reading a data block of size n where n is greater than zero from the queue and where the size of n is different from the size of m. The queue can be a FIFO queue. The queue can also have a configurable size.

21 Claims, 11 Drawing Sheets

WRITING AND READING DATA FROM A QUEUE

PRIORITY TO OTHER APPLICATIONS

This application claims priority from U.S. Provisional Application No. 60/314,443 filed Aug. 23, 2001, and titled "Hardware Services for a Programmable State Machine."

BACKGROUND

This disclosure relates to processing data using a data queue.

Typically, many network interfaces have different data transfer sizes. In some cases, the data transfer is a byte, a word of 32 bits or 64 bytes. Data is packed and unpacked to properly feed each interface with the appropriate amount of data at the appropriate rate. A data queue can be used to store bits of information to ensure data is provided properly. One type of data queue is a first-in-first-out (FIFO) queue. In a FIFO queue, the first bits stored in the queue are the first bits read from the FIFO queue.

DESCRIPTION

Figure 1:
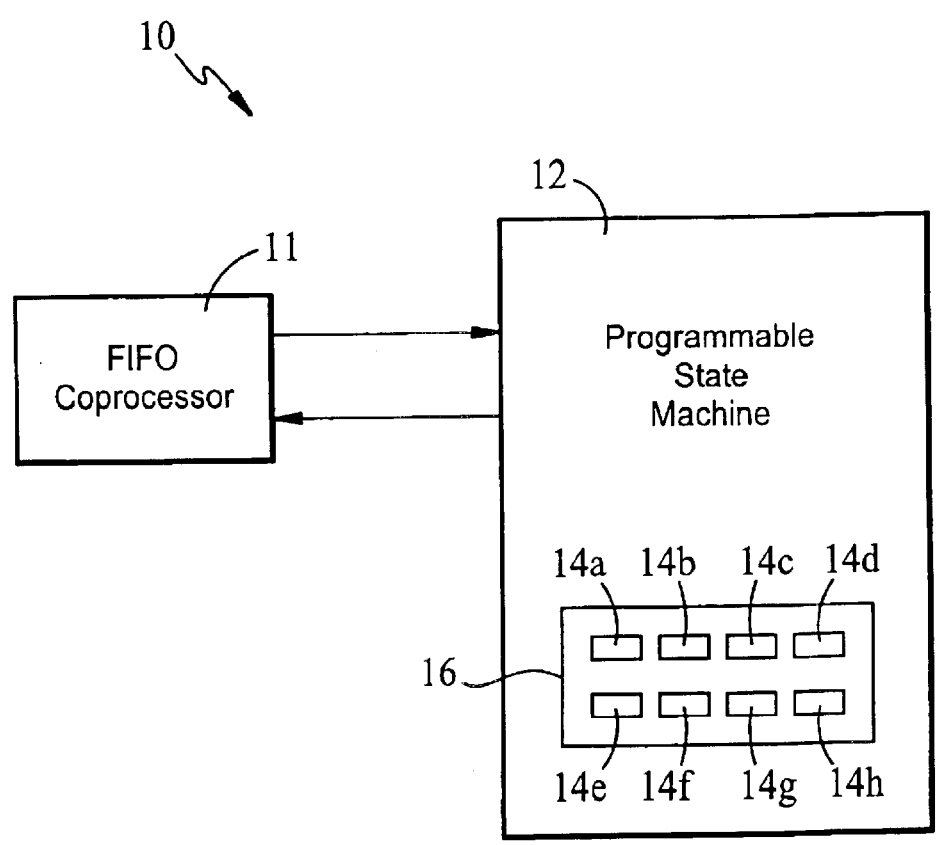
FIG. 1 is a block diagram of a FIFO queue management architecture.

Referring to FIG. 1, a first in first out (FIFO) queue management architecture 10 includes a FIFO coprocessor 11 and a programmable state machine (PSM) 12. FIFO coprocessor 11 performs maintains management information for eight FIFO queues (FIFO queue 14a–FIFO queue 14h) by managing a read pointer and a write pointer for each of the eight FIFO queues 14. FIFO coprocessor 11 also manages flags that indicate the full or empty status of each of the eight FIFO queues. FIFO queues 14 are allocated in a data memory 16 within PSM 12 and are software-defined by the PSM. As will be shown below, through the management of the flags and the pointers, FIFO coprocessor 11 allows for read sizes and write sizes to be different.

FIFO coprocessor 11 maintains the pointers and the flags for FIFO queues 14 in data memory 16. As data is read from a FIFO queue, the read pointer is incremented and as data is written to a FIFO queue, the write pointer is incremented. If the counters are equal the FIFO queue is either completely empty or completely full.

FIFO coprocessor 11 receives inputs from PSM 14 that include a signal to increment the read pointer and a signal to increment the write pointer received from each queue. FIFO coprocessor 11 also receives configuration parameters from PSM 14.

Each FIFO queue is configured by PSM 14 prior to being used. PSM 14 executes instructions having the configuration parameters to load configuration registers (not shown) within FIFO coprocessor 14. The configuration parameters include a FIFO queue base address (C_Base), a FIFO queue size (C_Size), a read and write pointer offset (C_Offset), a write entry size, a read entry size, a full watermark level (C_FullWM), and an empty watermark level (C_EmptyWM). The write entry size is the size in bytes that is written to the queue. The read entry size is the size in bytes that is read from a FIFO queue. The FIFO queue size is an integer multiple of both the read entry size and the write entry size so that the a pointer wrap point will occur between two entries and not within an entry. The write entry size and the read entry size are in powers of 2 ranging from 1 to $2^7$ bytes and defaults to one byte. The full watermark level indicates the most number of empty write entries that a FIFO queue has to be considered nearly full. For example, if the full watermark value is equal to 5, then if 5 or fewer write entries are empty, the FIFO queue is considered nearly full. Thus, if the write size is 1 byte, the FIFO queue is nearly full if 5 or fewer bytes are empty. The empty watermark level indicates the number of read entries that a FIFO queue has to be considered nearly empty. For example, if the empty watermark level is equal to 2, then if 2 or fewer read entries are full, the FIFO queue is considered nearly empty.

From these configuration parameters, other configuration parameters are derived for use with FIFO coprocessor 11 processing. These configuration parameters include a scaled full watermark level, a scaled empty watermark level, a total number of write entries parameter and a total number of read entries parameter. The scaled full watermark level (ScaledFullWM) is measured in bytes and is equal to the sum of the full watermark level and one times the write size ((C_FullWM+1)*WrSize). The scaled empty watermark level (ScaledEmptyWM) is measured in bytes and is equal to the sum of the empty water mark level and 1 times the read size ((C_EmptyWM+1)*RdSize). In a previous example, if the empty watermark level is equal to 2, then if 2 or fewer read entries are full, the FIFO queue is considered nearly empty. Thus, if the read size is 4 bytes, the FIFO queue is considered nearly empty until at least 12 bytes ((2+1)*4) are full.

The total number of write entries parameter (NumwrEntries) is equal to the FIFO queue size divided by the write size (C_Size/WrSize). The total number of read entries parameter (NumRdEntries) is equal to the FIFO queue size divided by the read size (C_Size/RdSize).

To process the read and write increment signals FIFO coprocessor 11 using state variables. These include a write index (S_WrIndex), a read index (S_RdIndex), a full flag (S_FullFlag) and an empty flag (S_EmptyFlag).

FIFO coprocessor 11 outputs six signals to PSM 14: a read pointer address (O_RdPtr), a write pointer address (O_WrPtr), an empty flag bit (S_EmptyFlag), a full flag bit (S_FullFlag), a nearly empty flag bit (O_NearlyEmptyFlag), and a nearly full flag bit (O_NearlyFullFlag). The read pointer address is the sum of the FIFO queue base address and a scaled read index. The scaled read index is the product of the read index and the read size. The write pointer address is the sum of the FIFO queue base address and a scaled write index. The scaled write index is the product of the write index and the write size.

Figure 2:
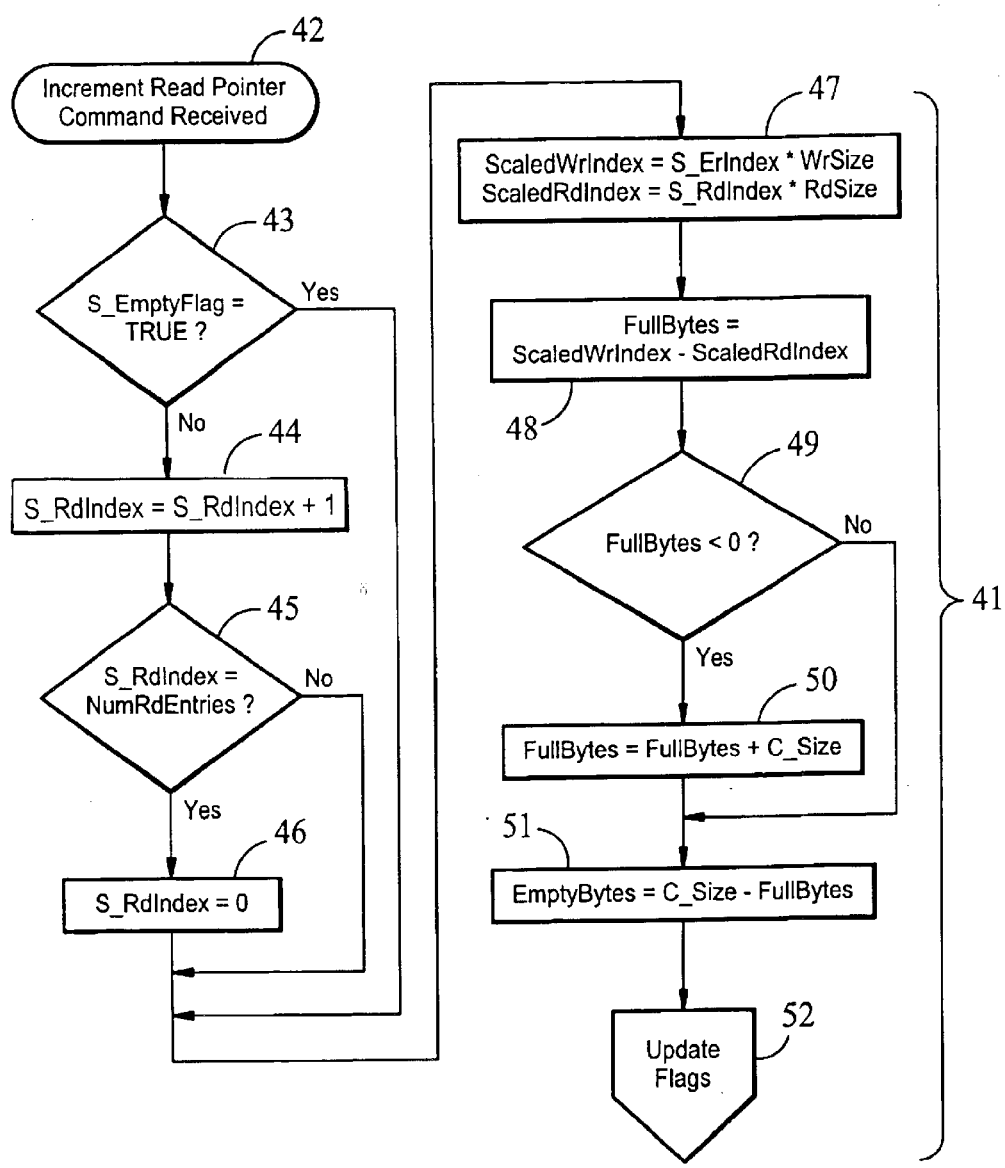
FIG. 2 is a flowchart for incrementing a read pointer from a FIFO queue.

Referring to FIG. 2, a process for incrementing a read pointer receives (42) an increment read pointer command from PSM 14. Process 40 determines (43) if an empty flag state variable (S_EmptyFlag) is true. If the empty flag state variable is not true, process 40 increments (44) a read index (S_RdIndex) by one. Process 40 determines (45) if the read index is equal to the total number of read entries (NumRdEntries). If the read index is equal to the total number of read entries, process 40 sets (46) the read index equal to zero. Process 40 sets (47) a scaled write index (ScaledWrIndex) equal to the write index times the write size; and a scaled read index (ScaledRdIndex) equal to read index times the read size. Process 40 sets (48) an "occupied bytes in a FIFO queue" variable (FullBytes) equal to the scaled write index less the scaled read index (ScaledWrindex−ScaledRdIndex). Process 40 determines (49) if the "occupied bytes in the FIFO queue" variable (FullBytes) is less than zero. If the "occupied bytes in the FIFO queue" variable is less than zero, process 40 increments (50) the occupied bytes in the FIFO variable by the FIFO queue size (C_size). Process 40 sets an "unoccupied bytes in a FIFO queue" variable (EmptyBytes) equal to the FIFO queue size less the number of occupied bytes in the FIFO queue. Process 40 updates (52) the flags.

Figure 3:
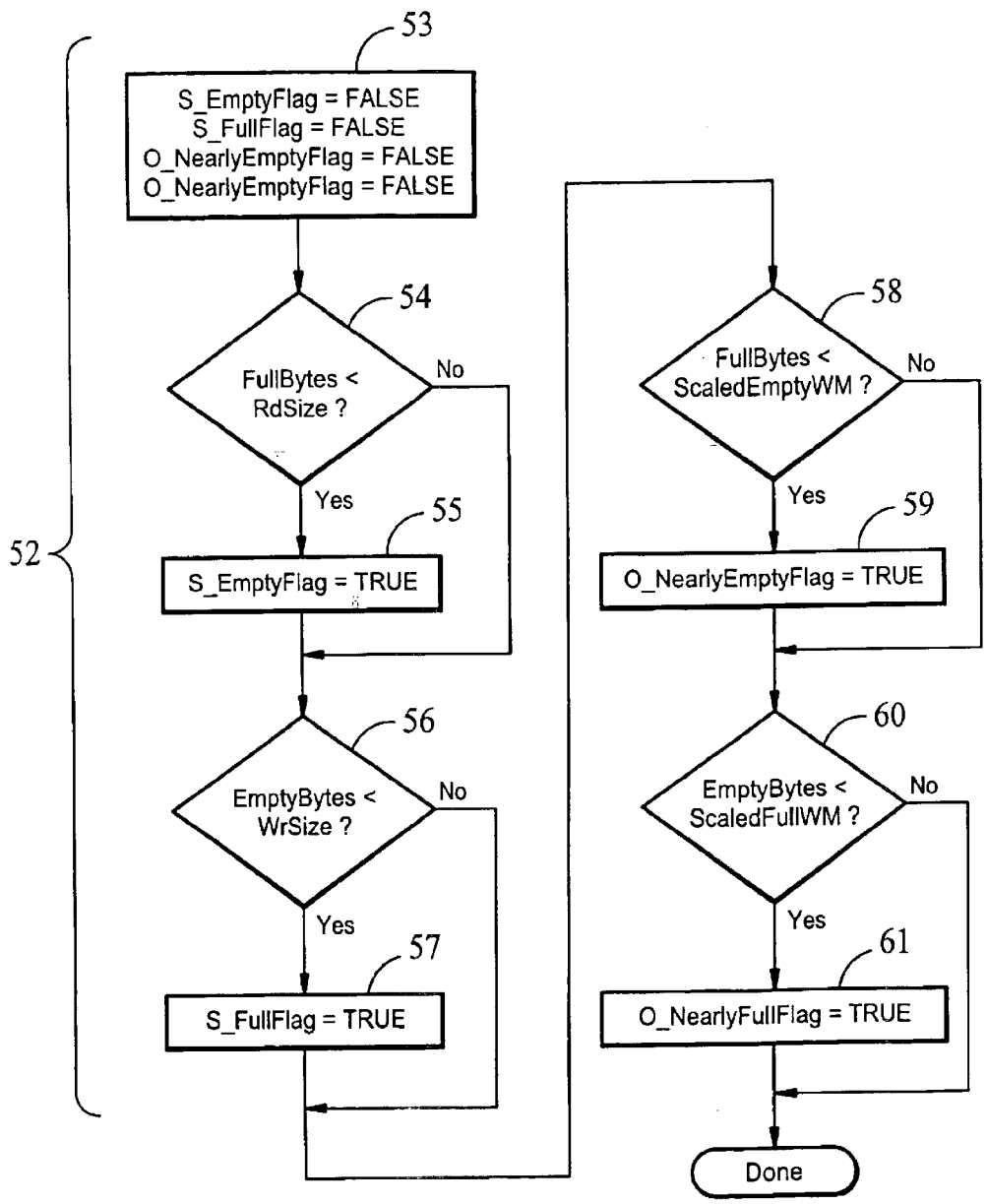
FIG. 3 is a flowchart for updating flags for the FIFO queue.

Referring to FIG. 3, process 52 for updating the flags sets (53) the empty flag (S_EmptyFlag), the full flag (S_FullFlag), the nearly empty flag (O_NearlyEmptyFlag), and the nearly full flag (O_NearlyFullFlag) to false. Process 52 determines (54) if the "occupied bytes in the FIFO queue" variable (FullBytes) is less than the read size (RdSize). If the "occupied bytes in the FIFO queue" variable (FullBytes) is less than the read size (RdSize), process 52 sets (55) the empty flag (S_EmptyFlag) equal to true. Process 52 determines (56) if the "unoccupied bytes in the FIFO queue" variable (EmptyBytes) is less than the write size (WrSize). If the "unoccupied bytes in the FIFO queue" variable (EmptyBytes) is less than the write size (WrSize), process 52 sets (57) the full flag (S_FullFlag) to true. Process 52 determines (58) if the "occupied bytes in the FIFO queue" variable (FullBytes) is less than the scaled empty watermark level (ScaledEmptyWM). If the "occupied bytes in the FIFO queue" variable (FullBytes) is less than the scaled empty watermark level (ScaledEmptyWM), process 58 sets (59) the nearly empty flag (O_NearlyEmptyFlag) to true. Process 52 determines (60) if the "unoccupied bytes in the FIFO queue" variable (EmptyBytes) is less than the scaled full watermark level (ScaledFullWM). If the "unoccupied bytes in the FIFO queue" variable (EmptyBytes) is less than the scaled full watermark level (ScaledFullWM), process 52 sets (61) the nearly full flag (O_NearlyFullFlag) to true.

Figure 4:
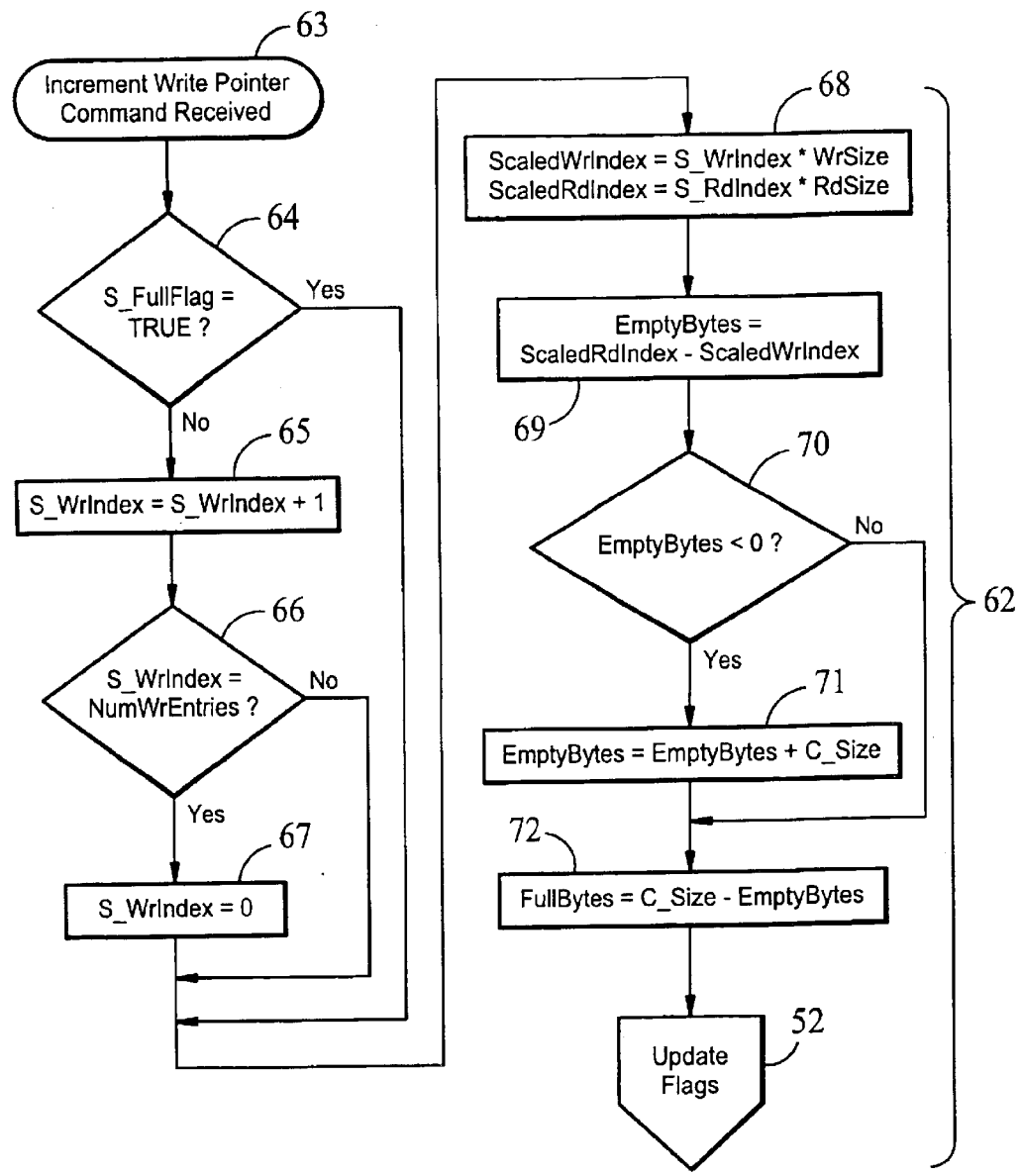
FIG. 4 is a flowchart for incrementing a write pointer from the FIFO queue.

Referring to FIG. 4, process 62 for incrementing a read pointer receives (63) an increment write pointer command from PSM 14. Process 62 determines (64) if a full flag state variable (S_FullFlag) is true. If the full flag state variable is not true, process 62 increments (65) a write index state variable (S_WrIndex) by one. Process 40 determines (66) if the write index state variable is equal to the total number of write entries (NumWrEntries). If the write index state variable is equal to the total number of write entries, process 62 sets (67) the write index state variable equal to zero. Process 62 sets (68) a scaled write index (ScaledWrIndex) equal to the write index times the write size; and a scaled read index (ScaledRdIndex) equal to the read index times the read size. Process 62 sets (69) the "unoccupied bytes in a FIFO queue" variable (EmptyBytes) equal to the scaled read index less the scaled write index (ScaledRdindex-ScaledWrIndex). Process 62 determines (70) if the "unoccupied bytes in the FIFO queue" variable (EmptyBytes) is less than zero. If the "unoccupied bytes in the FIFO queue" variable is less than zero, process 62 increments (50) the unoccupied bytes in the FIFO variable by the FIFO size (C_size). Process 62 sets the "unoccupied bytes in a FIFO queue" variable (EmptyBytes) equal to FIFO queue size less the number of occupied bytes in the FIFO queue. Process 62 updates (52) the flags.

In data assembly, the read entry size is larger than the write entry size. Small units of data are inserted into the FIFO queue, and then the data is extracted in larger units.

FIGS. 5A–5J depict a FIFO queue 80 during data assembly as the FIFO queue begins in an initially empty state, is filled to a completely full state, and is emptied during data disassembly to a completely empty state once again. In the example, the Full watermark value is 5, and the Empty watermark value is 2. The write entry size is 1; and the read entry size is 4. The write pointer value is 12 so that the absolute position of a write pointer 82 is 12 times the write entry size or 12 bytes into FIFO queue 80. The Read Pointer value is 3 so that the absolute position of a read pointer 84 is initially 4 times the read entry size or 12 bytes into the FIFO queue. There is no requirement that FIFO queue 80 become completely full before it is emptied, or vice-versa. In practice, data will begin to be extracted from FIFO queue 80 soon after a complete read entry is available.

Figure 5A:
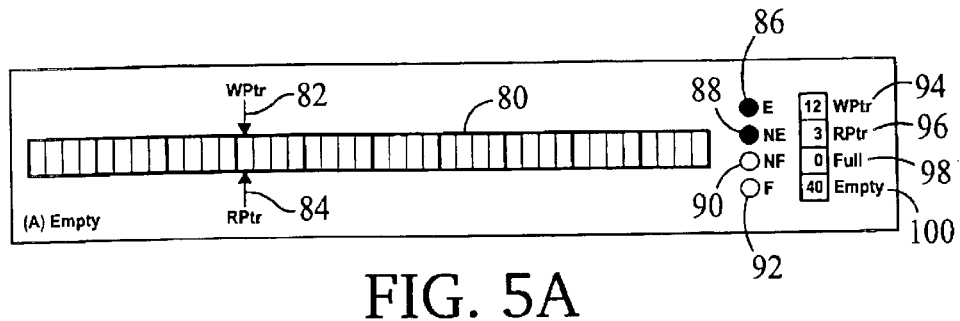
FIGS. 5A–5K are diagrammatical views of a representation of the FIFO queue during assembly.

Referring to FIG. 5A, when FIFO queue 80 is completely empty, an empty flag (E) 86 and a nearly empty flag (NE) 88 are both TRUE, and a full flag (F) 92 and a nearly full (NF) flag 90 are both FALSE. Read pointer 84 and write pointer 82 point to the same physical location in FIFO queue 80, but because the read and write entry sizes are different, a value of the write pointer 94 and a value of the read pointer 96 are different. Both pointers (WPtr 82 and RPtr 84) point to a location 12 bytes from the base of the FIFO queue, but since the read entry size is 4 bytes, value of RPtr 96 is only 3, since its units are read entries. The number of full slots is indicated by a full value 98, and the number of empty slots is indicated by an empty value 100.

Figure 5B:
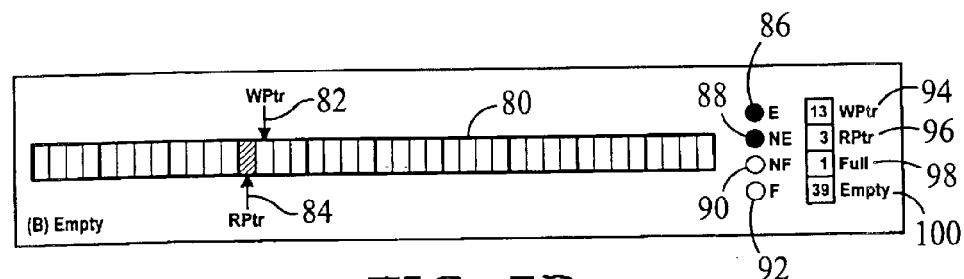

Referring to FIG. 5B, after one entry (1 byte in size) is written to FIFO queue 80, the only state variable that has changed is WPtr. In particular, empty flag 82 is still TRUE even though there is 1 valid byte of data in FIFO queue 80. The reason for this is empty flag 86 is associated with the number of read entries in FIFO queue 80. Because 4 bytes are required to produce a single read entry, a complete read entry is not yet available to be read out of FIFO queue 80. Thus, FIFO queue 80 is considered "empty".

Figure 5C:
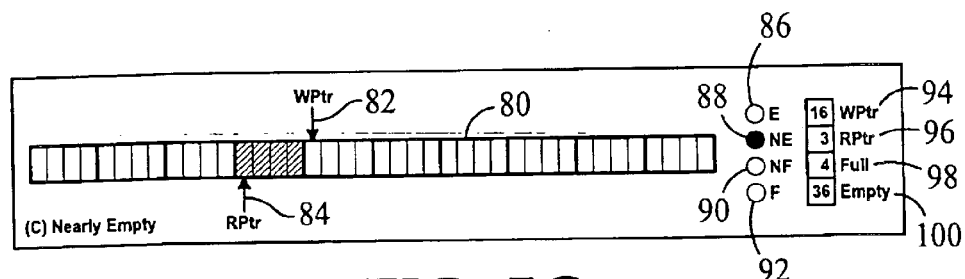

Referring to FIG. 5C, after 3 more bytes are written to FIFO queue 80, the total number of valid data bytes in the FIFO queue is 4, which is enough to make up a single read entry, and empty flag 86 transitions from TRUE to FALSE.

Figure 5D:
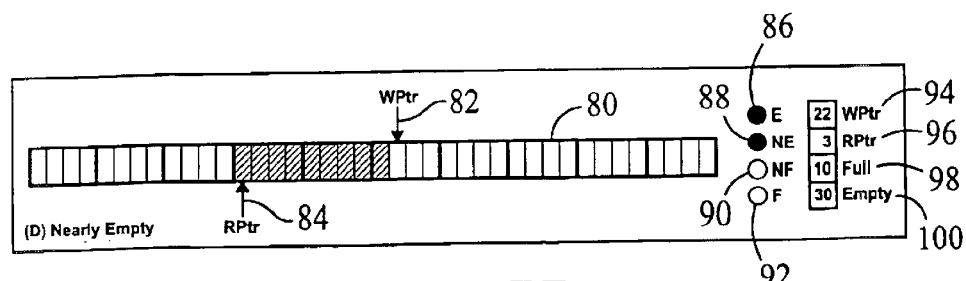

Referring to FIG. 5D, after 6 more write entries (1 byte in size) are written to FIFO queue 80, the total number of valid bytes in the FIFO queue is 10. This quantity of data is more than 2 read entries, but less than 3 read entries. Because the empty watermark is 2, the FIFO queue is still considered "nearly empty". Even though more than 2 read entries' worth of data is present in FIFO queue 80, nearly empty flag 90 does not become FALSE until a complete 3rd read entry is present.

Figure 5E:
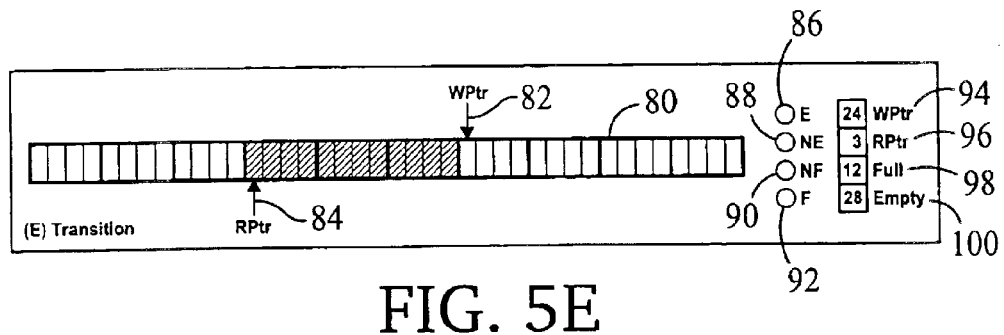

Referring to FIG. 5E, after 2 more entries are written to FIFO queue 80, bringing the total number of valid bytes up to 12, the FIFO queue becomes "not nearly empty". There are 3 read entries worth of data in FIFO queue 80. Since 3 is greater than the empty watermark (2), nearly empty flag 88 turns FALSE.

Figure 5F:
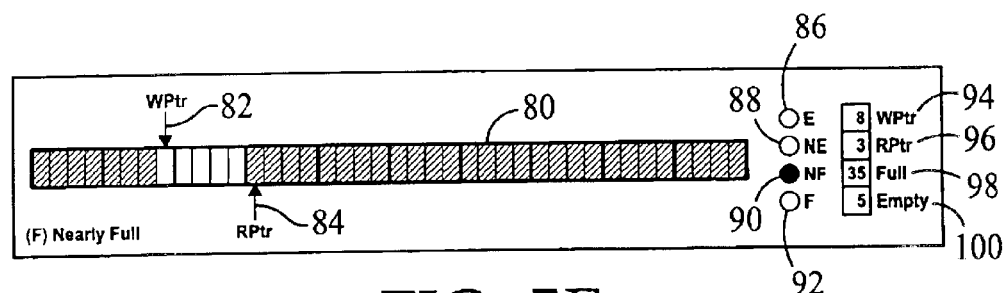

Referring to FIG. 5F, after 23 more entries are written to FIFO queue 80, only 5 empty bytes in the FIFO queue remain. Because the number of empty write entries in FIFO queue 80 is less than or equal to the full watermark (5 write entries), the FIFO queue is nearly full. However, full flag 92 is remains FALSE and will remain FALSE while the next 4 read entries are written to FIFO queue 80.

Figure 5G:
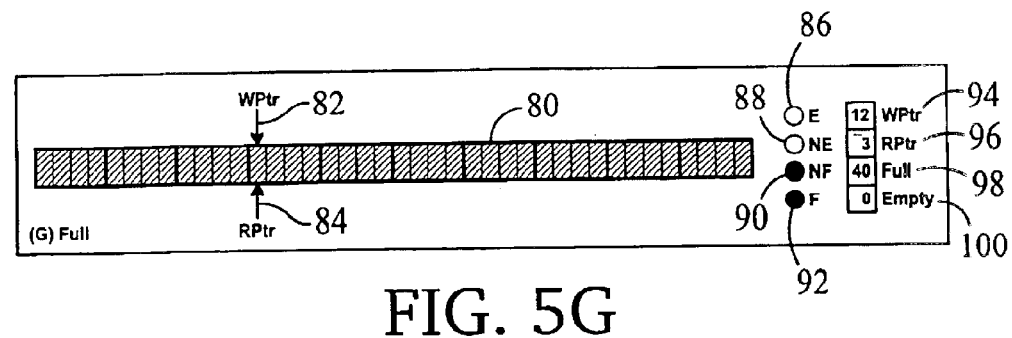

Referring to FIG. 5G, after 5 more entries are written, FIFO queue 80 is completely full. Both full flag 92 and nearly full flag 92 are TRUE. Note that just as in the completely empty case in FIG. 5A, the read and write pointers point to the same absolute location. The completely full case is distinguished from the completely empty case by the full and empty flags.

Figure 5H:
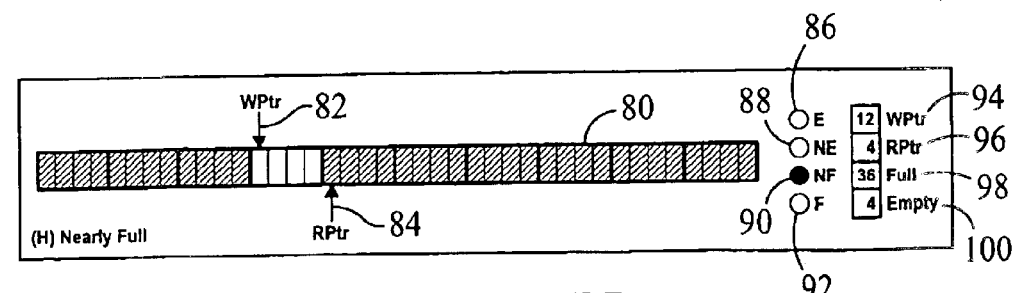

Referring to FIG. 5H, one entry (of 4 bytes) is read out of FIFO queue 80, causing full flag 92 to turn FALSE. However, nearly empty flag 90 remains TRUE because empty value 100 in FIFO queue 80 is now 4, which is less than or equal to the full watermark of 5.

Figure 5I:
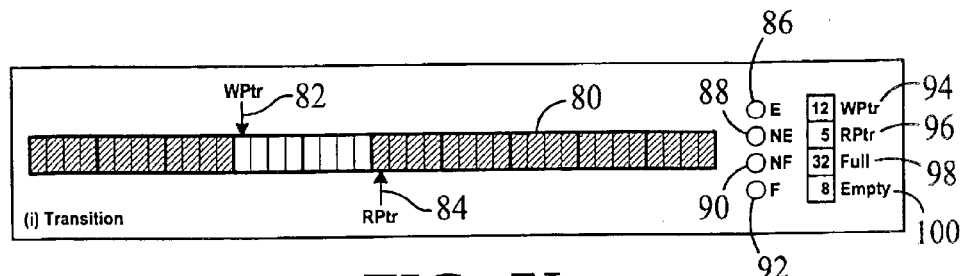

Referring to FIG. 5I, after 1 entry (of 4 bytes) is read out of FIFO queue 80, a total of 8 bytes are left unoccupied. Since this number is greater than the full watermark, FIFO queue 80 ceases to be nearly full (i.e., nearly full flag 90 becomes FALSE).

Figure 5J:
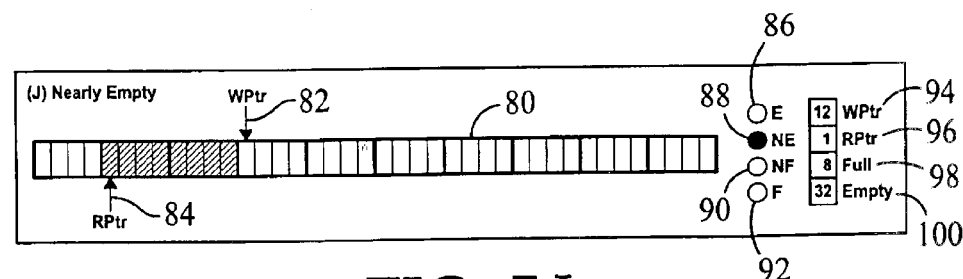

Referring to FIG. 5J, after 6 more entries are read from FIFO queue 80, a total of 2 read entries (8 bytes total) are left in the FIFO queue. Because the number of complete read entries is now less than or equal to the empty watermark, FIFO queue 80 is considered nearly empty.

Figure 5K:
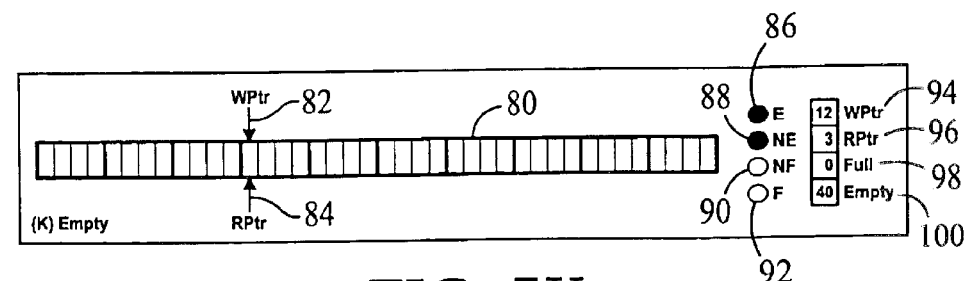

Referring to FIG. 5K, after 2 more entries are read from FIFO queue 80, the FIFO queue becomes completely empty, and both full flag 92 and nearly full flag 90 become TRUE.

In the above example, a write entry size of 1 byte and a read entry size of 4 bytes was used. In prior FIFO coprocessors, only a single entry size would exist which was used for both reads or writes. Suppose that a size of 1 byte were chosen for both the read and write entry sizes. The output interface requires data units of 4 bytes and thus should be alerted whenever 4 bytes or more are in the FIFO queue. This result could be achieved by setting the empty watermark value to 4 and using the nearly empty flag as an empty flag. However, in doing so, the additional functionality provided by the empty watermark value would be lost. The purpose of the empty watermark is to provide an additional interrupt to the process responsible for emptying the FIFO queue. In other words, one would like the empty flag to be used to alert the emptying process whenever there is at least one complete read entry in the FIFO queue. Likewise, one would prefer the nearly empty flag to be used to provide an additional signal to the emptying process whenever there are at least empty watermark value of complete read entries in the FIFO queue. If the empty watermark value is instead used to signal when there is just a single entry available to be read from the FIFO, the additional functionality of the nearly empty flag has been lost.

On the other hand, suppose that an entry size of 4 bytes were chosen for both FIFO reads and writes. The process that is supplying data to the FIFO queue is processing data in units of 1 byte at a time. Thus, in order to perform a write to the FIFO queue, the process must assemble these 1-byte data units into 4-byte write entries. This task is an additional burden on the process supplying the data. In addition, it would be impossible to specify the full watermark to a degree of precision of less than 4 (1 byte) write entries For instance, it would be impossible to specify a full watermark of 5 write entries, as in the example above. Finally, it would not be possible to have a genuine full flag. The FIFO queue will be considered full once there are fewer than 4 bytes left unoccupied, rather than when it is truly full (which occurs when there is no space left to write any additional entries).

In data disassembly, the read entry size is smaller than the write entry size. Large units of data are inserted into FIFO queue 80, and then the data is extracted in smaller units. FIGS. 6A–6J represent an example of data disassembly where FIFO queue 80 begins in an initially empty state, is filled to a completely full state, and then is emptied to a completely empty state once again. In the example, the Full watermark value is 1, and the empty watermark value is 14. The write entry size is 8; and the read entry size is 1. Write pointer value 94 is 2 so that the absolute position of a write pointer 82 is 2 times the write entry size or 16 bytes into FIFO queue 80. Read pointer value 96 is 16 so that the absolute position of a read pointer (RPtr) 84 is initially 16 times the read entry size or 16 bytes into FIFO queue 80.

Figure 6A:
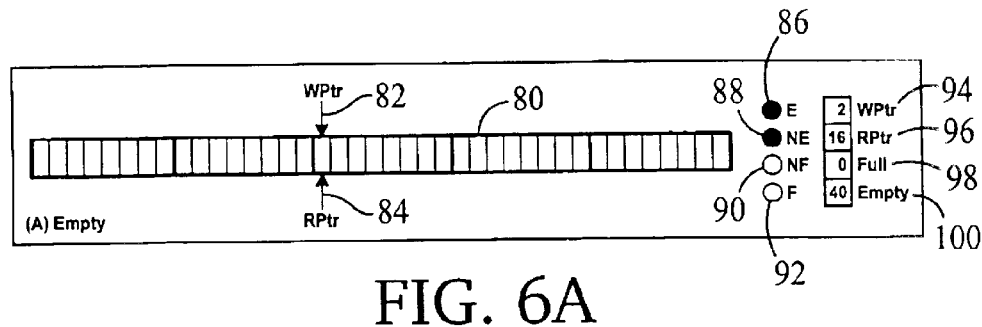
FIGS. 6A–6K are diagrammatical views of a representation of the FIFO queue during disassembly

In FIG. 6A, FIFO queue 80 is completely empty. Empty flag 88 and nearly empty flag 86 are both TRUE, and full flag 92 and nearly full flag 90 are both FALSE. The read and write pointers point to the same physical location in the FIFO queue, but because the read and write entry sizes are different, write pointer value 94 and read pointer value 96 are different. Both pointers (Wptr 82 and RPtr 84) point to a location 16 bytes from the base of the FIFO queue, but since is 2.

Figure 6B:
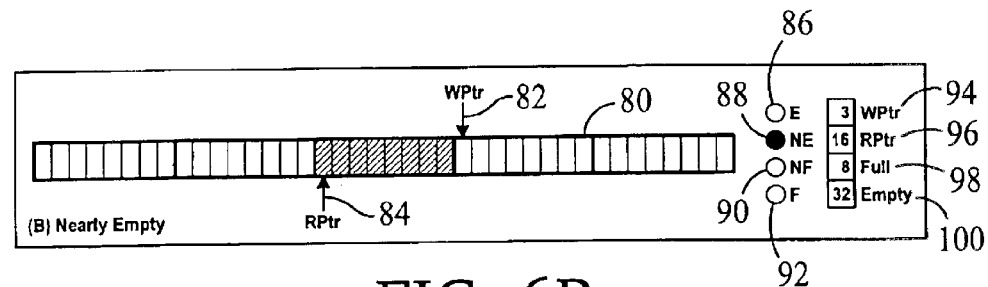

Referring to FIG. 6B, after 1 entry (of size 8 bytes) is written to FIFO queue 80, empty flag 92 transitions to FALSE. Because the write entry size is 1 byte, the insertion of a single 8-byte read write entry immediately populates FIFO queue 80 with 8 entries to read. Since there are 1 or more complete entries to read, empty flag 92 must be FALSE.

Figure 6C:
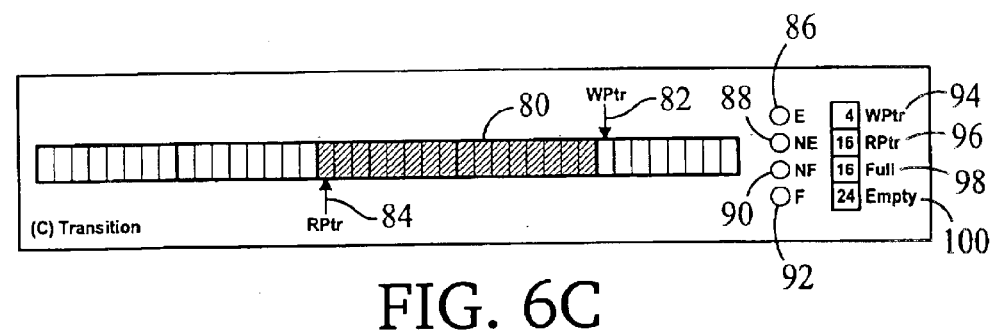

Referring to FIG. 6C, after 1 more write entry is written to FIFO queue 80, the total number of valid (1 byte) read entries in the FIFO queue is 16. This number is greater than the empty watermark value of 14, so nearly empty flag 90 transitions to FALSE. If a subsequent action were to read 2 entries from FIFO queue 80, nearly empty flag 90 would become TRUE, since the two reads would leave the FIFO queue with a total of 14 1-byte read entries, which is less than or equal to the empty watermark.

Figure 6D:
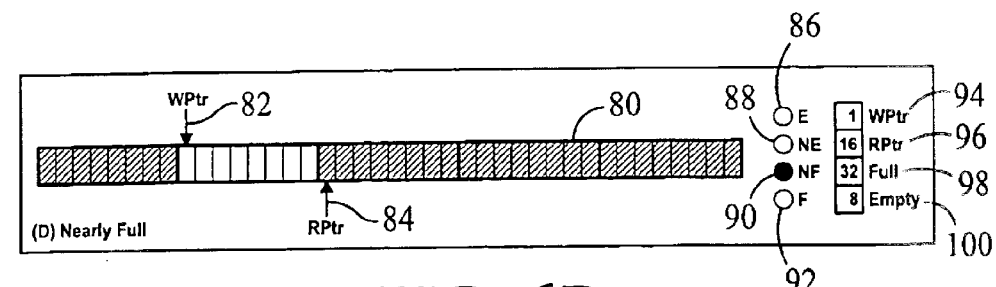

Referring to FIG. 6D, after 2 more write entries (8 bytes in size each) are written to FIFO queue 80, the total number of valid bytes in the FIFO queue is 32. There are exactly 8 bytes, or 1 write entry, left unoccupied in FIFO queue 80. Because the number of empty write "slots" is less than or equal to the full watermark (1), nearly full flag 90 transitions to TRUE at this point.

Figure 6E:
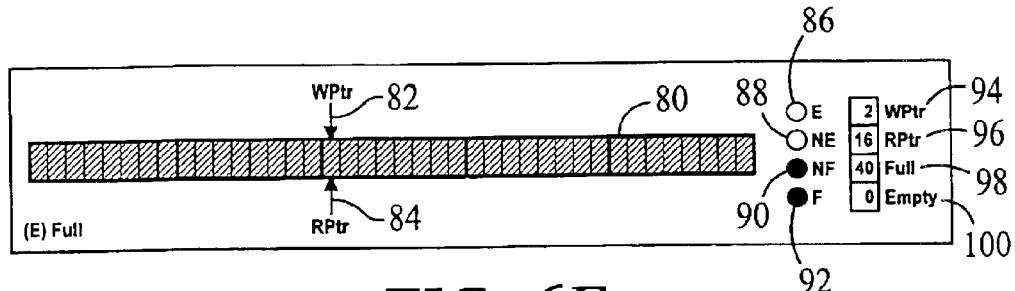

Referring to FIG. 6E, one more write to FIFO queue 80 causes full flag 92 to become TRUE. As in FIG. 6A, read pointer 84 and write pointer 82 point to the same absolute location. The completely full case is distinguished from the completely empty case by full flag 92 and empty flag 86.

Figure 6F:
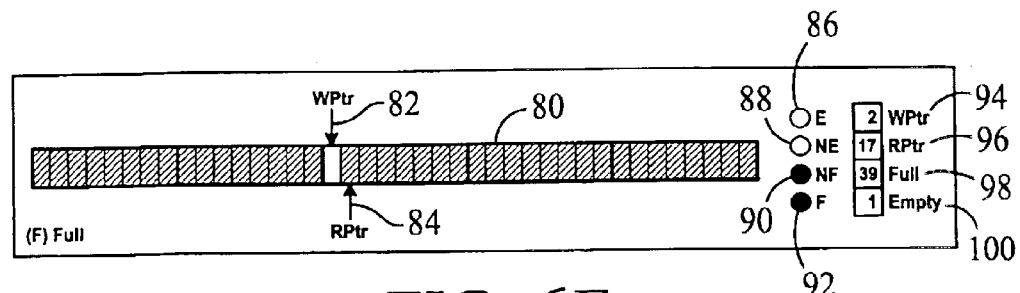

Referring to FIG. 6F, 1 entry (of 1 byte in size) is read from FIFO queue 80. Full flag 92 remains TRUE because even though not every byte in FIFO queue 80 is occupied because the number of unoccupied bytes in the FIFO queue (1) is less than the number of bytes in a single write entry (8), so it is impossible to write another entry into the FIFO queue at this time.

Figure 6G:
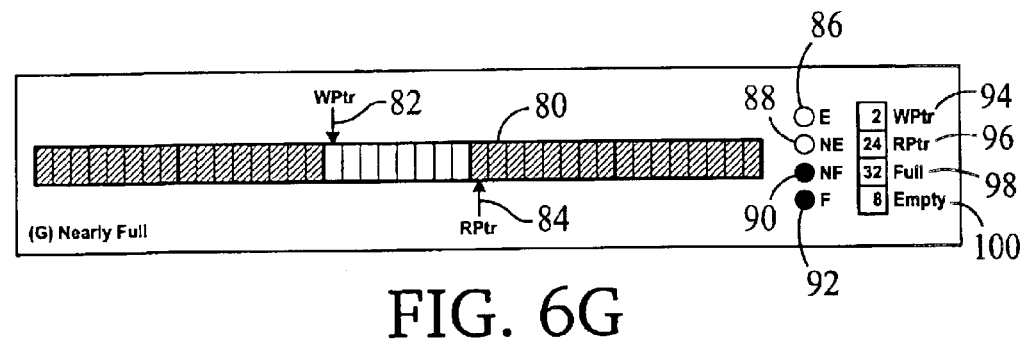
Figure 6H:
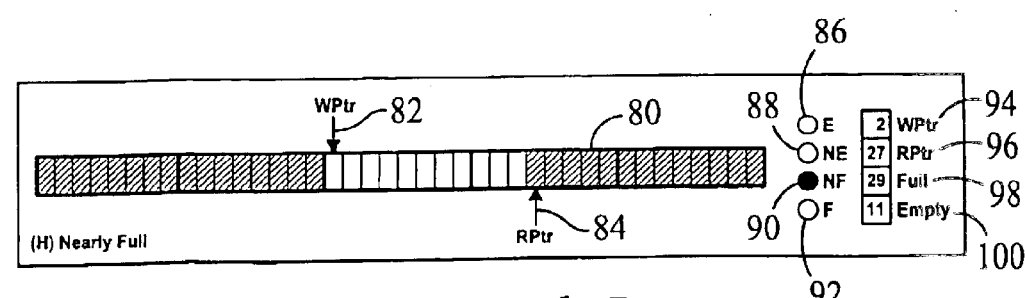

Referring to FIG. 6G, after 7 more entries (of 1 byte each) are read from FIFO queue 80, the total number of unoccupied bytes in the FIFO queue is 8. Because this number is greater than or equal to the number of bytes in a single write entry (8), full flag 92 transitions from TRUE to FALSE.

Nearly full flag 90 remains TRUE, because the number of available write "slots" (1) is less than or equal to the write watermark (1).

Figure 6I:
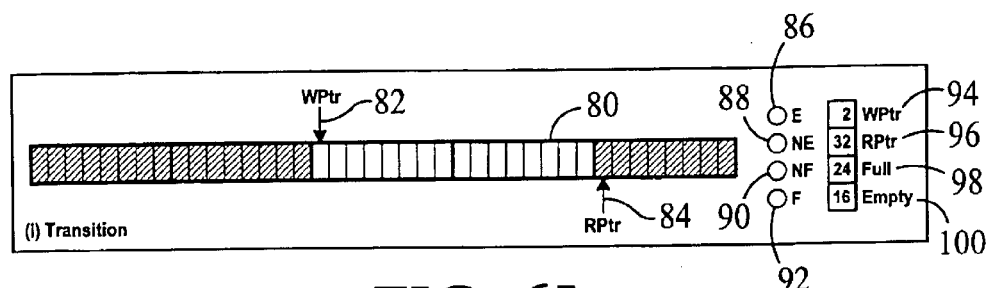

Referring to FIG. 6I, 3 more entries (of 1 byte each) are read from FIFO queue 80, bringing the total number of unoccupied bytes in the FIFO up to 11, which is more than the number of bytes in 1 write entry. However, nearly full flag 90 remains TRUE, because the number of complete write entries available is 1 (i.e., after 1 8-byte entry is written, there will be only 3 unoccupied bytes left in FIFO queue 80, making it impossible to write any more entries into the FIFO queue until some entries are read out). Since 1 is less than or equal to the full watermark (1), FIFO queue 80 remains nearly full.

Referring to FIG. 6I, after 5 more (1-byte) entries are read out of FIFO queue 80, a total of 16 bytes, or 2 entire write entries, are left unoccupied. Since the number of available write "slots" (2) is now greater than the full watermark, nearly full flag 90 becomes FALSE.

Figure 6J:
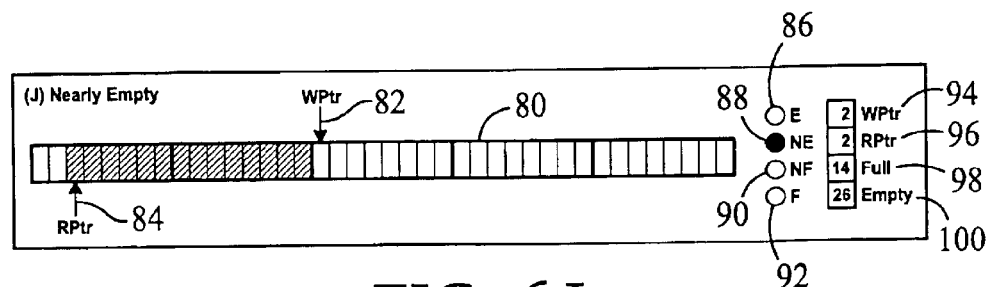
Figure 6K:
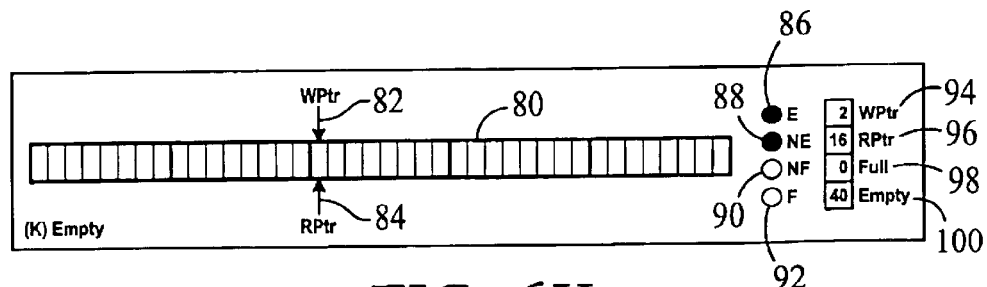

Referring to FIG. 6J, after 10 more entries (1-byte) are read from FIFO queue 80, a total of 14 bytes of valid data are left in the FIFO queue. Because the number of entries available to be read (14) is now less than or equal to the empty watermark (14), nearly empty flag 90 transitions from FALSE to TRUE. Referring to FIG. 6K, after 14 more entries are read from FIFO queue 80, empty flag 92 becomes TRUE.

Being able to have differing read and write entry sizes is an improvement over having the same entry size for each. For example, suppose that a size of 1 byte were chosen for both the read and write entry sizes. The input interface processes data in units of 8 bytes and are alerted whenever there are 8 or more unoccupied bytes in FIFO queue 80. This result could be achieved by setting the empty watermark to 8 and using the nearly full flag as a full flag. However, the additional functionality provided by the full watermark would be lost. The purpose of the full watermark is to provide an additional interrupt to the process responsible for filling FIFO queue 80. In other words, one would like the full flag to be used to alert the filling process whenever there is at least one complete empty write "slot" available in FIFO queue 80. Likewise, one would like prefer the nearly full flag to be used to provide an additional signal to the emptying process whenever there are at least full watermark value of complete empty write "slots" available in FIFO queue 80. If the full watermark value is instead used to signal when there is just a single write "slot" available, the additional functional of the nearly full flag has been lost.

On the other hand, suppose that an entry size of 8 bytes were chosen for both FIFO reads and writes. The process that is reading data from FIFO queue 80 is processing data in units of 1 byte at a time. Because data extracted from FIFO queue 80 must be processed a single byte at a time, the process doing the reads must disassemble the 8-byte FIFO entries into single byte units for processing. This task is an additional burden on the process doing the data extraction. In addition, it would be impossible to specify the empty watermark to a degree of precision of less than 8 (1-byte) read entries. For instance, it would be impossible to specify an empty watermark of 14 read entries, as in the example above. Finally, there would be no way to have a genuine empty flag. FIFO queue 80 will be considered empty as long as there are fewer than 8 bytes valid data bytes in the FIFO queue, rather than when it is truly empty.

Figure 7:
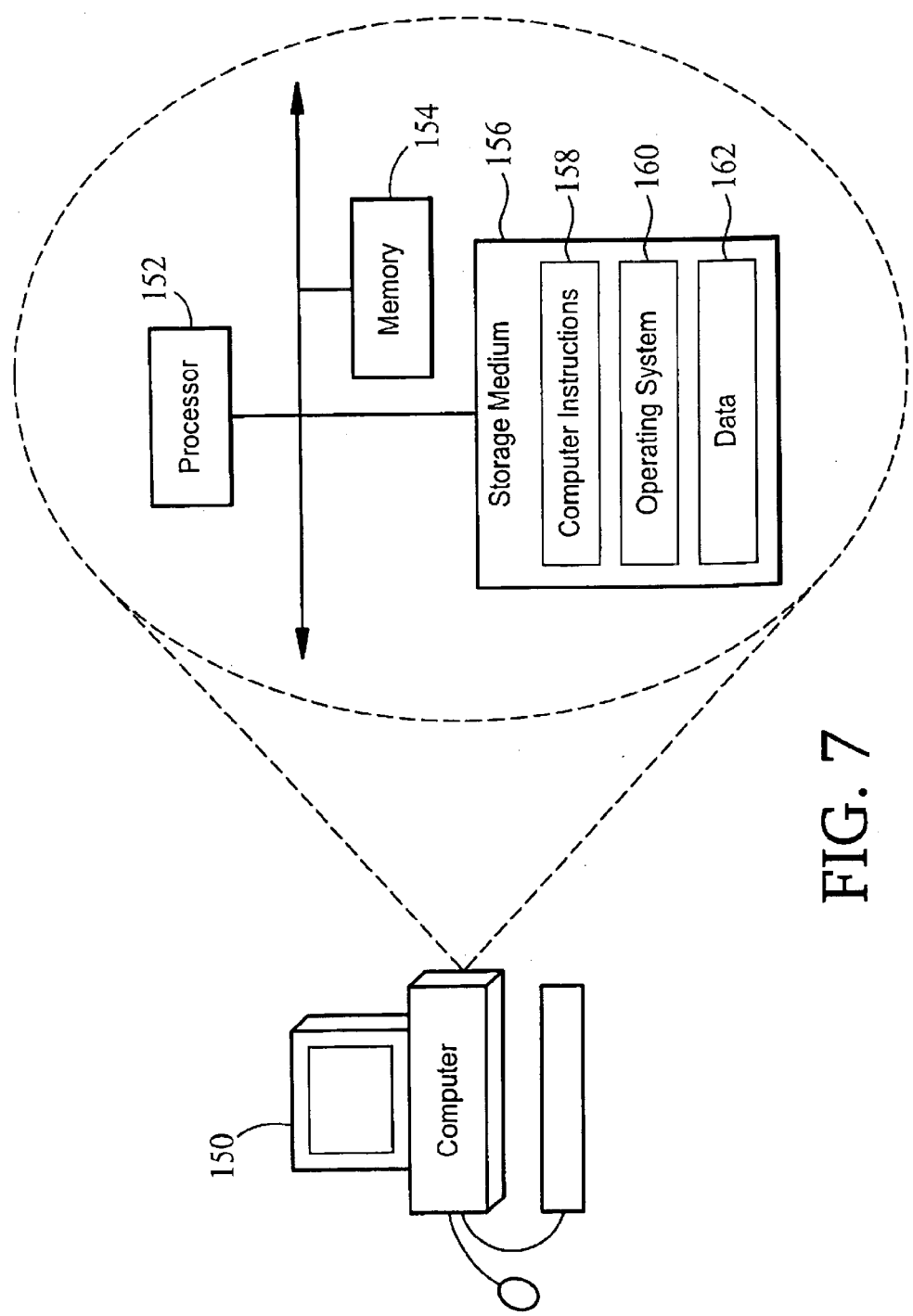
FIG. 7 is a block diagram of a computer system on which the process of FIGS. 2–4 may be implemented.

FIG. 7 shows a computer 150 for managing FFI queues. Computer 160 includes a processor 152 for managing flags and pointers within each FIFO queue, a memory 154 to store eight FIFO queues, and a storage medium 156 (e.g., hard disk). Storage medium 156 stores operating system 160, data 162, and computer instructions 158 which are executed by processor 152 out of memory 154 to perform process 40, process 52 and process 62.

Process 40, process 52 and process 62 are not limited to use with the hardware and software of FIG. 7; the processes may find applicability in any computing or processing environment and with any type of machine that is capable of running a computer program. Process 40, process 52 and process 62 may be implemented in hardware, software, or a combination of the two. Process 40, process 52 and process 62 may be implemented in computer programs executed on programmable computers/machines that each includes a processor, a storage medium/article readable by the processor (including volatile and non-volatile memory and/or storage elements), at least one input device, and one or more output devices. Program code maybe applied to data entered using an input device to perform process 50 and to generate output information.

Each such program may be implemented in a high level procedural or objected-oriented programming language to communicate with a computer system. However, the programs can be implemented in assembly or machine language. The language may be a compiled or an interpreted language. Each computer program may be stored on a storage medium (article) or device (e.g., CD-ROM, hard disk, or magnetic diskette) that is readable by a general or special purpose programmable computer for configuring and operating the computer when the storage medium or device is read by the computer to perform process 40, process 52 and process 62. Process 40, process 52 and process 62 may also be implemented as a machine-readable storage medium, configured with a computer program, where upon execution, instructions in the computer program cause the computer to operate in accordance with process 40, process 52 and process 62.

The disclosure is not limited to the specific embodiments described herein. For example, the FIFO coprocessor, the FIFO queues, and PSM may be located on the same integrated circuit. The disclosure is not limited to the specific processing order of FIGS. 2–4. Rather, the blocks of FIGS. 2–4 may be reordered, as necessary, to achieve the results set forth above.

Other embodiments not described herein are also within the scope of the following claims.

What is claimed is:

1. A method of processing data comprising:
   writing a data block of size m where m is greater than zero into a queue;
   reading a data block of size n where n is greater than zero from the queue and where the size of n is different from the size of m;
   managing a read pointer of the queue;
   managing a write pointer of the queue; and
   managing a set of flags indicating a status for the queue, the set of flags including a full flag, a nearly full flag, an empty flag and a nearly empty flag.

2. The method of claim 1, further comprising:
   receiving instructions from a programmable state machine to increment a read pointer.

3. The method of claim 1, further comprising:
   receiving instructions from a programmable state machine to increment a write pointer.

4. The method of claim 1 further comprising:

receiving configuration parameters to configure the queue, the configuration parameters including a size of the queue, a base address of the queue, a full watermark value and an empty watermark value.

5. The method of claim 1 wherein the queue is a first-in-first-out (FIFO) queue.

6. The method of claim 1 wherein the queue has a configurable size.

7. The method of claim 1, further comprising reading and writing data of different sizes from a plurality of queues.

8. An apparatus comprising:

a memory that stores executable instructions;

a processor that executes the instructions to:

write a data block of size m where m is greater than zero into a queue;

read a data block of size n where n is greater than zero from the queue and where the size of n is different from the size of m;

manage a read pointer of the queue;

manage a write pointer of the queue; and manage a set of flags indicating a status for the queue, the set of flags including a full flag, a nearly full flag, an empty flag and a nearly empty flag.

9. The apparatus of claim 8, further comprising instructions to:

receive instructions from a programmable state machine to increment a read pointer.

10. The apparatus of claim 8, further comprising instructions to:

receive instructions from a programmable state machine to increment a write pointer.

11. The apparatus of claim 8, further comprising instructions to:

receive configuration parameters to configure the queue, the configuration parameters including a size of the queue, a base address of the queue, a full watermark value and an empty watermark value.

12. The apparatus of claim 8 wherein the queue is a first-in-first-out (FIFO) queue.

13. The apparatus of claim 8 wherein the queue has a configurable size.

14. The apparatus of claim 8, further comprising instructions to:

read and write data of different sizes from a plurality of queues.

15. An article comprising a machine-readable medium that stores executable instructions for managing a queue, the instructions causing a machine to:

write a data block of size m where m is greater than zero into a queue;

read a data block of size n where n is greater than zero from the queue and where the size of n is different from the size of m;

manage a read pointer of the queue;

manage a write pointer of the queue; and manage a set of flags indicating a status for the queue, the set of flags including a full flag, a nearly full flag, an empty flag and a nearly empty flag.

16. The article of claim 15, further comprising instructions causing the machine to:

receive instructions from a programmable state machine to increment a read pointer.

17. The article of claim 15, further comprising instructions causing the machine to:

receive instructions from a programmable state machine to increment a write pointer.

18. The article of claim 15, further comprising instructions causing the machine to:

receive configuration parameters to configure the queue, the configuration parameters including a size of the queue, a base address of the queue, a full watermark value and an empty watermark value.

19. The article of claim 15 wherein the queue is a first-in-first-out (FIFO) queue.

20. The article of claim 15 wherein the queue has a configurable size.

21. The article of claim 15, further comprising instructions causing the machine to:

read and write data of different sizes from a plurality of queues.

* * * * *